United States Patent [19]

Ratliff

[11] 4,005,788
[45] Feb. 1, 1977

[54] VEHICULAR DELIVERY RAMP APPARATUS

[75] Inventor: Roger D. Ratliff, Irving, Tex.

[73] Assignee: Pepsico Inc., Purchase, N.Y.

[22] Filed: Oct. 1, 1975

[21] Appl. No.: 618,400

[52] U.S. Cl. .............................. 214/77 P; 296/57 R
[51] Int. Cl.² ............................................ B60P 1/48
[58] Field of Search ............. 214/75 T, 77 R, 77 P, 214/152; 187/8.52, 97; 24/201 B; 292/251.5; 296/50, 57 R

[56] References Cited

UNITED STATES PATENTS

| | | | |
|---|---|---|---|
| 2,098,376 | 11/1937 | Cunneen | 187/8.52 |
| 2,435,729 | 2/1948 | Whann et al. | 292/251.5 X |
| 2,928,122 | 3/1960 | Trevaskis | 292/251.5 X |
| 3,587,883 | 6/1971 | Neely | 214/77 P |
| 3,641,693 | 2/1972 | Pinnow | 24/201 B X |
| 3,764,030 | 10/1973 | Randall | 214/77 P |

*Primary Examiner*—L. J. Paperner
*Attorney, Agent, or Firm*—Scully, Scott, Murphy & Presser

[57] ABSTRACT

An apparatus for cargo handling including a vehicular delivery ramp mounted for horizontal extension from a truck body and vertical displacement between lowered and elevated positions. The delivery ramp incorporates a manually operable control and is adapted to be pivoted upwardly into the truck when not in use.

5 Claims, 3 Drawing Figures

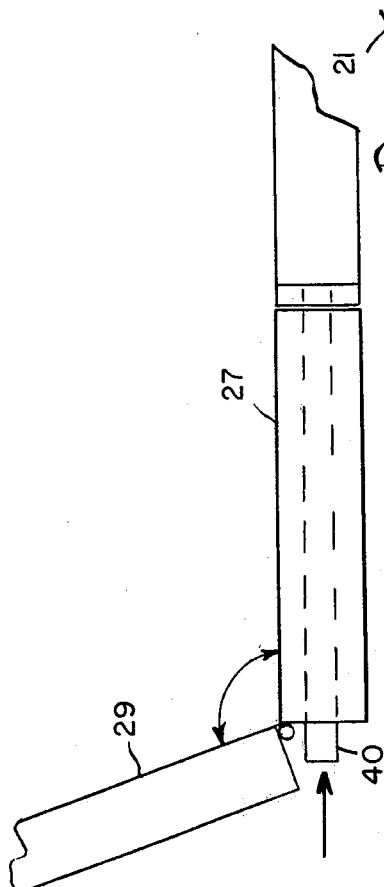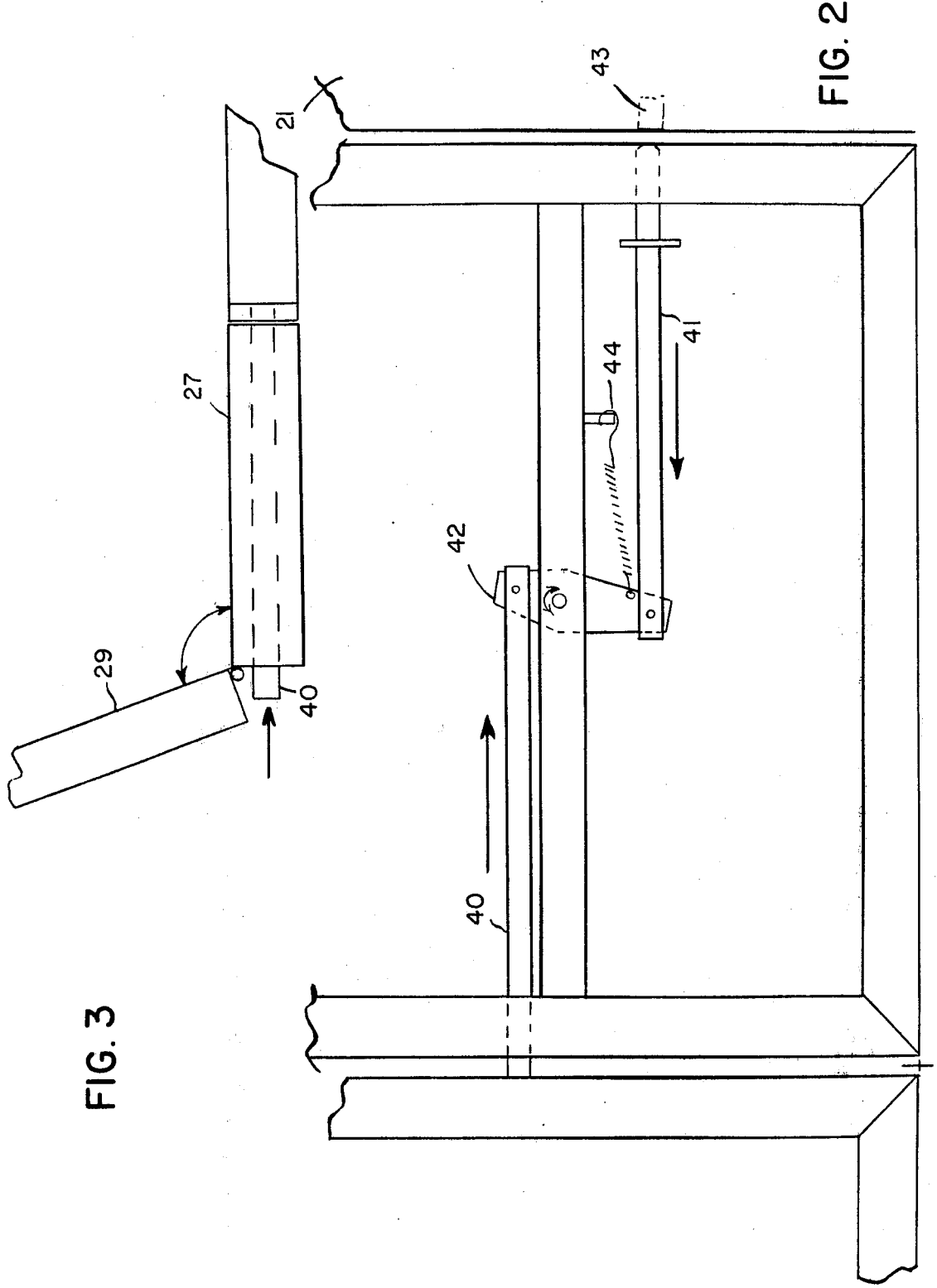

VEHICULAR DELIVERY RAMP APPARATUS

This invention relates to systems including methods and apparatus for the facilitation of cargo handling in loading and unloading raised truck beds and the like. More specifically, there are disclosed improvements in elevator construction including control mechanisms for the handling of relatively heavy cargo.

Ramp type elevtor constructions for the presentment of cargo at ground level or a selected height from a fixed load level are now commonplace, especially where relatively heavy goods are involved. Thus, the goods are shifted or rolled onto a rear or side ramp which is initially established at the load level, and then the entire ramp carrying the cargo is displaced vertically and sometimes horizontally into a position level with a loading platform, curb or the ground for further translocation or delivery.

In the case of major delivery stops utilizing large tractor trailers and loading ramps, manpower and/or various labor saving devices e.g. fork lifts are readily available and even heavy cargo handled with relative ease and safety.

The more frequent delivery situation, however, is the small retail operation, where a few cases of goods are removed and returnables accepted at each location. Typically, a van delivery with a side mounted elevator is required, because of parking limitations and the concomitant necessity of curb side unloading. Manpower is sharply restricted, the common practice involving only a single driver-loader, and accordingly safety considerations are emphasized.

This situation is typified without limitation in the handling of beverages, in bottles or cans, where standard bulk carries weighing up to 1400 lbs. when laden are widely employed. These carriers are 72 inches in height and are accordingly inherently tippable in addition to being difficult to manipulate in view of their weight, especially for one man to handle.

The critical handling phase occurs as the carrier is removed from the truck proper and rolled onto the ramp, as the momentum developed may carry the cargo farther than desired, and passage along the angulated terminus leading to ground level required for these devices may cause tipping and loss of the payload.

It is often necessary for the carrier to be indexed into the ramp opening from the interior of the truck and accordingly essential that the carrier's forward motion be terminated surely and safely such that the driver may relocate exteriorly of the truck for controlled unloading from the ramp.

Where the ramp elevation feature is called into play as for ground or curbside delivery, the cargo is again placed in motion and requires restraint against rolling from a stable position, particularly where the location is such that the truck bed cannot be maintained in a level configuration.

This invention deals with control mechanisms for cargo handling adapted to prevent indiscriminate rolling or sliding of cargo during loading and unloading operations from ramp beds.

Such devices are known, as disclosed for example in U.S. Pat. No. 3,764,030. Thus, in this case the patentee provides a roll-off preventing mechanism comprising a vertically shiftable gate member disengageable by lever action upon reaching the ground. This arrangement is desirably the subject of further improvements is design, especially for safety in operation, and for elevated delivery ramp postures.

BRIEF DESCRIPTION OF THE INVENTION

In accordance with the invention, a vehicular delivery ramp is provided with a cargo restraint device elevatable above the surface thereof into a position to prevent rolling or sliding motion of cargo deposited thereon. A planar bar vertically displaceable within a transverse slit in the deck portion of the ramp is exemplary. The operation of the restraint member is controllably interengaged with elevation means for the ramp to provide fail-safe operation insuring that the restraint member is exposed to provide limitation of cargo movement.

The restraint mechanism comprises an extended weighted arm which is mounted for rotation about a fulcrum formed by a transversely mounted rod, the rotation of the rod mechanically effecting the vertical displacement of the planar bar portion constituting the cargo restraint, per se.

The cargo restraint bar may be physically displaced into a recessed position by simple mechanical depression, as by the foot of the operator. However, the weighted arm (usually, about a 3:1 weight ratio) leverages the restraint bar upwardly as soon a the depressing force is removed, except when the weight is relieved by resting on the ground or other loading surface.

Since the operator is fully engaged with the cargo in the unloading process, the invention provides an electromagnet locking device for the recessed position of the restraint bar. i.e. with the electromagnet energized, the restraint bar is lockingly engaged in the recessed position.

To provide fail-safe operation, the electromagnet is energized only for a selected, limited period of time, and upon being automatically deenergized, the force maintaining the restraint bar in the recessed position is released, effecting (by the weighted leveraging action) and automatic redeployment of the restraint bar into the active upstanding posture. A timed cycle of 20 – 40 seconds is usually suitable for handling of a single item of cargo. This feature insures that the restraint mechanism is in place when the next piece of cargo is indexed onto the deck of the ramp for unloading.

In some instances, it may be desirable to disengage the restraint bar for longer periods of time, although the ramp is in an elevated position with an exposed undersurface such that the weighted leveraging action causes the restraint bar to be in the activated position. In such cases, the electromagnet may be energized manually and the restraint bar locked into a recessed position, but an interlock provided by the control circuitry disengages the elevator such that it may not be moved. (the same interlock operates at any time and for such time as the electromagnet is energized.) The electromagnet cycle may be overridden manually to engage the elevator, but only by deenergizing the magnet, which automatically (by action of the counterbalance) redeploys the restraint bar.

The invention may be further understood by reference to the drawings associated herewith, in which:

FIG. 2 is a plan view of a locking mechanism for the delivery ramp of this invention.

FIG. 3 is a side elevational view of the locking mechanism.

DETAILED DESCRIPTION OF THE INVENTION

Figure 1:
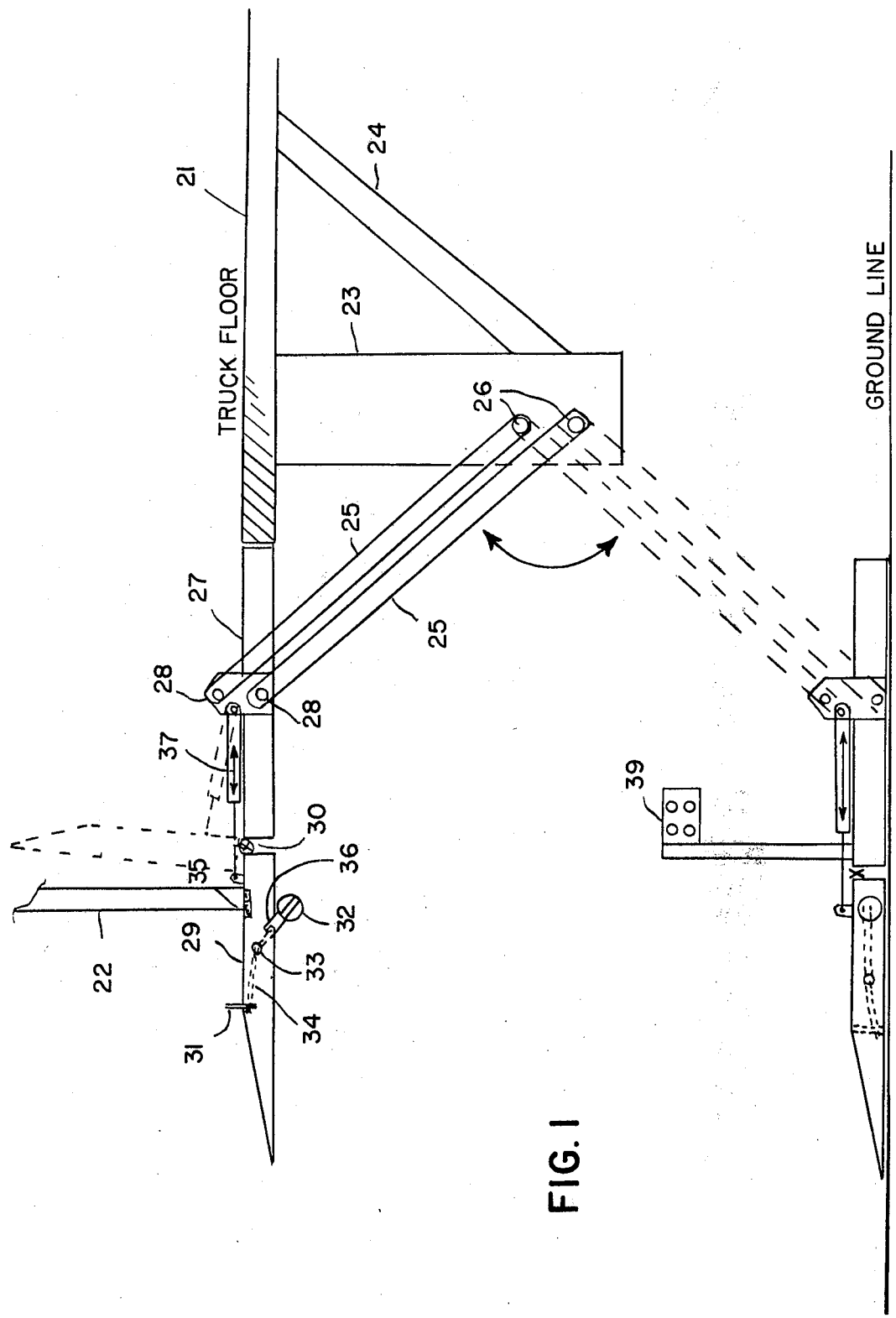
FIG. 1 is a side elevational view of the vehicular delivery ramp of the present invention.

The truck floor or bed is of conventional construction employing cantilevering and counterbalancing means for the side elevator mechanism except that a well or opening is formed at one side of the truckbed for insertion of the elevator and ramp devices i.e. the floor is discontinuous to the extent of the dimension of the ramp platform.

Suitably, the entire elevator and ramp construction is retracted into a recessed configuration in part by folding of the operative elements and in part by retraction form a horizontally extended position in such manner as not to extend beyond the well proper.

However, in both the extended and retracted configuration, it is a feature of the present device that no significant part of the supportive frame lies above the truck floor, to maximize freedom of translocation within the truck.

The ramp comprises at one end a flat platform or deck of generally rectangular configuration. In use, this portion of the ramp forms the upper support surface for cargo during operation of the elevation means and is located for indexing of cargo thereupon in the well formed at the side of the truckbed in such manner as to substantically extend across the whole of the well and to fill out the truck floor. As the invention in its most preferred aspects is related to the delivery of beverge orders utilizing standard bulk carriers, the dimensions of the platform (and the ramp) are selected to receive a 27 × 40 × 72 (h) inches carrier in either extended position.

The opposed portion of the ramp comprises an apron, or in section an elevated plane, at its elevated portion contiguous with the support platform and continuous therewith and at its recessed portion contiguous and continuous with ground elevation on a loading platform, etc.

Typically the ramp affords a rolling length of 12–15 inches or defines an angle of inclination of 12° to 15° The region below the surface may comprise no more than a shell for necessary engineering support detail.

The platform and inclined plane portions constitute in use an integral ramp for the loading and unlaoding of goods, but are hingedly mounted for accurate dismounting toward engagement of the respective upper surfaces for storage, within the truck well.

Of course, in certain and sometimes preferred embodiments, the platform portion may extend somewhat beyond the hinge mounting. In fact, having the most preferred embodiment regard for the need to insure full retraction of the unit in transit and to provide a controllable hand hold from outside the truck or mainly the platform portion is transacted so that about ⅔ falls within the truck proper and ⅓ or less extends beyond the truck wall. However, in all such cases, the unit is hingedly or rotatably mounted and retracted such that the entirety of the mechanism extending beyond the truck side wall in use is disposed within its boundaries for transit.

The underlying surface will in general conform to conventional engineering design having regard for the functions performed.

The exception is that a region is provided for mounting of the electromagnet in a recessed position adjacent one terminus of the arc of rotation of the counterbalance of the restraint mechanisn in the position corresponding to a recessed restraint bar. Commonly, the restraint mechanism is mounted about a rod journalled for rotation in a position extending transversely of the deck, wtih the restraint bar proper and its lever arm extending forwardly i.e. toward the exterior, and the counterbalance portion extending rearwardly.

The platform portion of the ramp, adjacent the apron is provided with a transversely extending aperture or slit adapted to receive the restraint bar, ordinarily disposed in a normal plane i.e. parallel to the side of the truck. The restraint bar is vertically extensible in a freely movable manner through the slit to act as a stop barrier to further movement of cargo when extended. The restraint bar itself is usually an upstanding planar metal structure of minor demension, extending 2 to 3 inches above the deck in operative position. Conveniently, the bar may comprise one or more raised positions for ready foot engagement.

Of course, the gate, barrier or restraint means may as appropriate be comprised of dicontinuous members such as stiff pins, or an intermeshed screen or the like, provided that such elements are adapted to ready and endless deployment and retraction. The restraint device is provided for a payload of 1200 – 1500 lbs/carrier but of course is entended principally to control only rolling or sliding action involving lesser forces of lower magnitude.

The electromagnet locking device is of conventional design, and provides a perpendicular holding force on the order of 75 pounds, drawing 12 volts and about 8 amps. The control circuitry also is conventionally and readily available off-the-shelf. The controls are conveniently located in a well at the side of the truck, as well as in a mobile stand extending vertically from the platform when the operator rides the elevator. An interlocking circuit arrangement renders the mobile controls primary when in use.

The system is shut down i.e. fully disengaged to avoid mishap in the retracted position, and is automatically reconnected with the covering overhead retracting door is fully opened, activating a toggle switch or like device.

It is a further feature of the invention, locking bolts or pins are adapted to be received in the truck floor substructure at the inner side of the well. The pins are carried by the platform substructure and are mounted through an appropriate extension to be exposed at their opposite end in the hinge lap of the apron. As the apron is deelevated from its vertical stored position, and assumes a horizontal position, the pin extensions are forced inwardly, through biasing means relieving and disengaging the opposed pin portions inserted within the flooring. Obviously, as the apron is retracted for storage, the pins are forced into engagement with the truck keying the platform into horizontal meeting relationship.

Referring to FIG. 1, there is illustrated the delivery ramp shown mounted on a truck van body comprised of a conventional chassis frame including a conventional floor 21, a side panel 22 with a loading door (not shown) and a floor cut-out or opening.

The delivery ramp of this invention includes a ramp generally indicated at 20 and mounted to the underside of floor 21 through mounting bracket 23 supported by support bar 24 by 2 sets of parallel arms attached to bracket 23 by inner pivot mounts 26 and to ramp 20 by outer pivot mounts 28. Ramp 20 is composed of ramp deck 27 hingedly attached to ramp apron 29 through apron hinge 30.

Apron 29 is provided with planar restraint bar 31 which is vertically shiftable through a slot (not shown) extending laterally across the apron to a retracted or extended position by associated lever arm or counterbalance 32 pivoted to the apron by pivot 33. The counterbalance is provided with contact plate 36 for contact with electromagnet 35 mounted on the underside of apron 29 as with a stud bolt or spring mount urging the electromagnet into contact with the contact plate 36 to restrain the activating movement of counterbalance 32 when desired. Ramp apron 29 is also provided with hydraulic lift means 37 to lift arpon 29 to a generally perpendicular attitude to ramp deck 27 when not in use, particularly to permit closing the door (not shown). Mobile control panel 39 is mounted on one side of ramp deck 27.

In operation, the delivery ramp of this invention is lowered and raised by a conventional hydraulic system (not shown) by two hydraulic cylinders, and associated hydraulic power system, mounted on the underside of the truck floor, through two sets of parallel arms 25 mounted on either side of the delivery ramp. The ramp apron can be lowered when convenient but is usually lowered by the associated hydraulic system before the delivery ramp is lowered.

When the delivery ramp is lowered to ground position (shown in dotted line configuration in FIG. 1), counterbalance 32 is disposed upwardly and results in retraction of restraint bar 31. When the delivery ramp is raised, this permits counterbalance 32 to extend restraint bar 31. However, when the delivery ramp is lowered to a platform or level, above ground level, the operator manually depresses the restraint bar and energizes the electromagnet which holds the counterbalance in "up" position through the contact plate and retains the restraint bar in retracted position. For convenience, timer may be employed to deactivate the electromagnet after a predetermined period of time, after which the restraint bar will assume the normal extended position. For convenience, the predetermined period of time can be a time period sufficient for the operator to remove the cargo carrier from the ramp, e.g. 20–40 seconds. Optionally, the timed sequence can be interrupted at any point by the mere expediency of shutting off the timer. The timer mechanism uses standard equipment and may be conveniently controlled by a simple on-off control which may be located, along with the control for raising and lowering of the ramp, on the delivery ramp as shown in FIG. 1.

When the delivery ramp is in fully raised position, ramp deck 27 occupies the full dimension of the floor opening and is conveniently provided with a locking mechanism to assure continuity and evenness of the truck floor surface. Referring to FIGS. 2 and 3, the locking mechanism is composed of push rod 40 journalled through outer wall of ramp deck 27 and pivotally attached to bias arm 42 attached to rib on the underside of the ramp deck. Similarly attached to bias arm 42 is lock rod 41 which is journalled through the rear wall of the ramp deck and is seated in slot 43 in the slot frame of the truck flooring. As apron 29 is lowered into planar configuration with the ramp deck, push rod 40 is engated by the hinged edge of apron 29 and urges pivot bias 42 such that lock rod 41 is released from slot 43, leaving ramp deck 27 free. When the ramp deck is finally raised into transport position, and apron 29 is raised by its associated hydraulic system, spring tensioning means 44 returns lock rod 41 into slot 43 and push rod 40 assumes its original position.

For ease of description the present invention has been principally described relative to a truck for beverage delivery utilizing standard bulk carriers, however, it is understood that the cargo restraint system described has applicability generally to cargo handling in vessels of lading of all types, including trains, aircraft, merchant ships and the like; cargo of all kind and nature, including mail and comestibles; and delivery and pickup operations generally, as for franchise systems, etc.

What is claimed is:

1. In a ramp loading apparatus for raising or lowering cargo to or from a truck floor bed by a hydraulically controlled ramp loader, the improvement which comprises a cargo restraint means including a gate disposed in the surface of said loader and capable of vertical extension relative to said surface; an integral, magnetic counterbalance, said gate and said counterbalance being pivotally connected such that the spatial disposition of the counterbalance causes an opposite spatial disposition of the gate; electromagnetic means spatially disposed to effect an electromagnetic field on said counterbalance when said gate assumes a recessed mode in said surface; and means for actuating said electromagnetic means, the means for said raising and lowering being de-energized when said electromagnetic means engages said counterbalance to maintain said gate in a recessed mode in said surface.

2. Apparatus according to claim 1 including timing means to limit the period of engagement of said gate by said counterbalance.

3. A vehicular delivery ramp adapted for elevated cargo delivery comprising a generally horizontal platform forming a cargo support surface and defining transversely thereof in the outermost region relative to said vehicle an extended aperture; cargo restraint means including a gate for freely movable vertical extension through said aperture between recessed and exposed positions relative to the cargo support surface, and an integral counterblance comprising magnetic material, said gate and said counterbalance being connected through rigid lever arms extending in an opposed manner from a rod journalled for rotation in and about said platform in such manner as to expose and recess said gate through said aperture in response to the action of the counterbalance; electromagnetic means located to intersect the arc of rotation of the counterbalance at a point corresponding with the recessed position of said gate, and energizing means therefor; and timing means for de-energizing said electromagnetic means; said electromagnetic means capturing the counterbalance magnetically when said counterbalance is rotated by manual depression of said gate into a position adjacent said electromagnetic means in an energized condition; and said timing means disengaging the energy source to said electromagnetic means after a preselected period of time elaspses, whereby said gate is cycled by rotation into an exposed position for cargo restraint.

4. Locking mechanism for hydraulically controlled truck ramp loader comprised of hingedly connected planar sections, the first section being adapted to assume an angled position to the second section when in transport mode, said second section being provided with a push rod journalled through the forward side of said section to permit engaging contact with the rear edge of said first section when said first section assumes a coplanar configuration with said second section, the opposed end of said push rod being pivotally engaged with a lock rod journalled through the rear side of said second section and engaging a slot in the truck body such that when said push rod is engaged by said first section, the lock rod is removed from said slot.

5. Apparatus according to claim 4 further including a spring mechanism urging said lock rod into said slot.

* * * * *